(12) United States Patent
Adler

(10) Patent No.: US 6,791,528 B2
(45) Date of Patent: Sep. 14, 2004

(54) BACKLIGHT SYSTEM ARCHITECTURE FOR MOBILE DISPLAY SYSTEM

(75) Inventor: Glenn Jay Adler, Redwood City, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 100 days.

(21) Appl. No.: 09/992,601

(22) Filed: Nov. 13, 2001

(65) Prior Publication Data

US 2003/0090454 A1 May 15, 2003

(51) Int. Cl.⁷ .................................................. G09G 3/36
(52) U.S. Cl. .................... 345/102; 345/211; 340/815.4; 361/681; 455/561; 455/571; 713/340
(58) Field of Search .............................. 345/102, 905, 345/211, 214, 48; 713/300, 310, 320, 321, 323–324, 330, 340; 455/561, 571, 575, 90; 463/31, 46, 47; 340/815.42, 815.5; 361/686, 681, 683

(56) References Cited

U.S. PATENT DOCUMENTS

| | | | | |
|---|---|---|---|---|
| 5,325,280 A | * | 6/1994 | Tortola et al. | 362/234 |
| 5,696,529 A | * | 12/1997 | Evanicky et al. | 345/659 |
| 5,796,382 A | * | 8/1998 | Beeteson | 345/102 |
| 5,854,617 A | * | 12/1998 | Lee et al. | 345/102 |
| 6,151,008 A | | 11/2000 | Zhang | |
| 6,301,106 B1 | * | 10/2001 | Helot et al. | 361/686 |
| 6,417,833 B1 | * | 7/2002 | Takemoto | 345/102 |
| 6,426,736 B1 | * | 7/2002 | Ishihara | 345/102 |
| 6,462,941 B1 | * | 10/2002 | Hulick et al. | 361/683 |
| 6,625,015 B2 | * | 9/2003 | Yin | 361/686 |
| 2001/0043188 A1 | * | 11/2001 | Nakamura | 345/102 |

* cited by examiner

Primary Examiner—Henry N. Tran
(74) Attorney, Agent, or Firm—Michael E. Schmit

(57) ABSTRACT

The present invention provides a mobile display system with an improved backlight system. In one embodiment of the invention, the mobile display system comprises a mobile unit including a flat panel display, and a first backlight circuit for providing light to the display. The first backlight circuit includes a plurality of lights sources disposed near edges of the mobile unit and a single power supply for powering a pre-selected one of the light sources. The system also comprises a base station capable of being powered by an external power source. The base station includes a second backlight circuit that comprises at least one power supply for powering the plurality of light sources in the mobile unit when the mobile unit is attached to the base station. This invention keeps the weight and power consumption of the mobile unit low, but allows long battery life at the compromise of display surface light intensity while mobile and provides high brightness characteristics when docked.

11 Claims, 5 Drawing Sheets

BACKLIGHT SYSTEM ARCHITECTURE FOR MOBILE DISPLAY SYSTEM

BACKGROUND OF THE INVENTION

The invention generally relates to backlight systems, and more particularly to backlight systems for mobile display systems.

Mobile devices, such as mobile and handheld PCs, portable TVs and other mobile Internet appliances, have been widely used in our daily lives. Due to their size and mobility, these devices are particularly convenient to people who travel frequently or need to have access to information at any time or in any location, from the Internet or in a stored database for example. When the AC power is available, mobile devices are typically used in conjunction with a docking station on a desktop or elsewhere in an attached or docked mode. The docking station provides network connections as well as connections to peripheral devices, such as a printer. Because their flexibility of being able to be used in either docked mode or mobile (or undocked) mode, there are requirements for high brightness (with similar luminance as stationary monitors) when the mobile devices are docked and powered by mains power, and for optimization of battery life when they are operated in the mobile mode.

A conventional solution for notebook PCs for example, is to use a dimmable power supply. In this case, the backlight power is regulated based on the condition of the re-charger being attached to the notebook PC. When the notebook PC is used in the mobile mode, the optimization of battery life can be achieved by reduction of power in the backlight. This consequently results in reduction of luminance to 60–80 candela/$m^2$. If the notebook PC is plugged into an AC power outlet on the wall, the maximum power of the backlight is increased by increasing the current of the internal lamp or the current duty cycle, relative to its maximum value in the battery operated mode. However, even with the increase of the current the brightness achieved is only in the range of 80–100 candela/$m^2$, which is far less bright as compared to that of flat panel monitors powered mains power, which has the luminous intensity of 250 plus candela/$m^2$.

Thus, most mobile electronic products today are not able to achieve high brightness, unless both weight and thickness are sacrificed.

Therefore, there is a need for a mobile device that maintains mobile characteristics of low weight, thinness and long battery life, while providing functionality, e.g., high brightness, of a mains powered desktop product.

SUMMARY OF THE INVENTION

The present invention provides a mobile display system with an improved backlight system. According to a first embodiment of the invention, the mobile display system comprises a mobile unit including a flat panel display, and a first backlight circuit for providing light to the display. The first backlight circuit includes a plurality of lights sources disposed near edges of the mobile unit and a single power supply for powering a pre-selected one of the light sources. The system also comprises a base station capable of being powered by an external power source. The base station includes a second backlight circuit that comprises at least one power supply for powering the plurality of light sources in the mobile unit when the mobile unit is attached to the base station. This embodiment allows the use of a single power supply in the mobile unit, keeping weight and power consumption low, but allowing long battery life at the compromise of display surface light intensity.

According to a second embodiment of the invention, the mobile display system comprises a mobile unit including a flat panel display, and a first backlight circuit for providing light to the display. The flat panel display has selected surfaces made in materials capable of coupling external light. The first backlight circuit includes a single light source disposed near a pre-selected edge of the mobile unit and a single power supply for powering the light source. The system also comprises a base station capable of being powered by an external power source. The base station includes a second backlight circuit that comprises a plurality of light sources disposed near edges of the base station and at least one power supply for powering the plurality of light sources. The base station has selected surfaces made of materials capable of coupling light out of the plurality of light sources and into the display when the mobile unit is attached to the base station. This embodiment allows the use of a single power supply and a single light source in the mobile unit, keeping weight and power consumption low, but allowing long battery life at the compromise of display surface light intensity.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
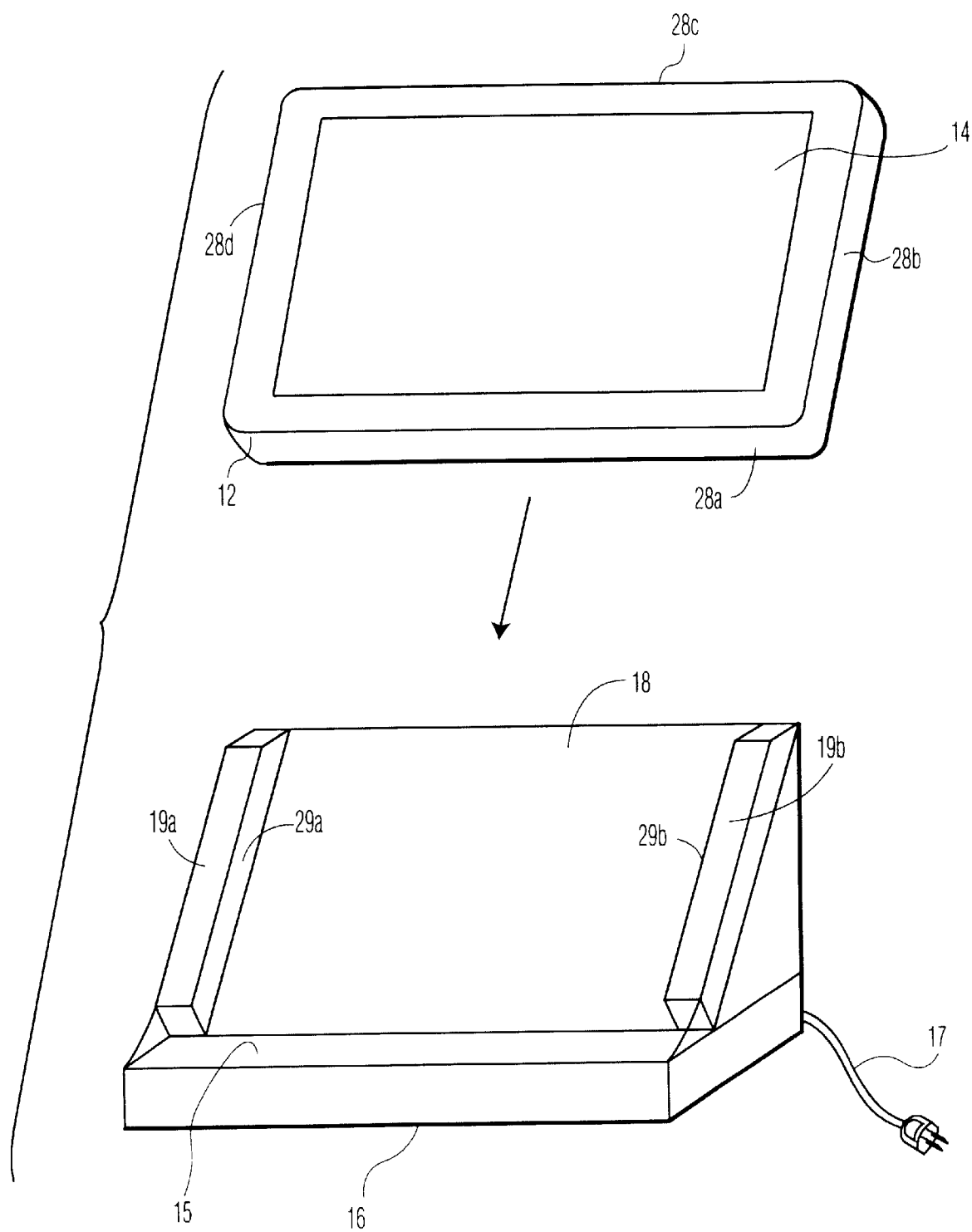
FIG. 1 shows a basic configuration of a mobile display system according to one embodiment of the invention.

FIG. 1 shows a basic configuration of a mobile display system 10 according to one embodiment of the invention. Display system 10 comprises a battery powered mobile unit 12 and a mains powered base station 16, which includes an electrical cord 17 for plugging into an AC power outlet or other external power source. Mobile unit 12 has four edges 28a, 28b, 28c and 28d and includes a flat panel display 14. Mobile unit 12 may be either a stand-alone mobile device, e.g., a mobile PC, or a flat panel monitor, e.g., a LCD display, for use with a mobile device. Base station 16 is configured to have a surface 15, a slanted surface 18 and two guiding rails 19a and 19b. Guiding rails 19a and 19b have inner surfaces 29a and 29b, respectively, facing to each other. Mobile unit 12 can be attached to base station 16 along slanted surface 18 and guiding rails 19a and 19b onto surface 15.

Figure 2A:
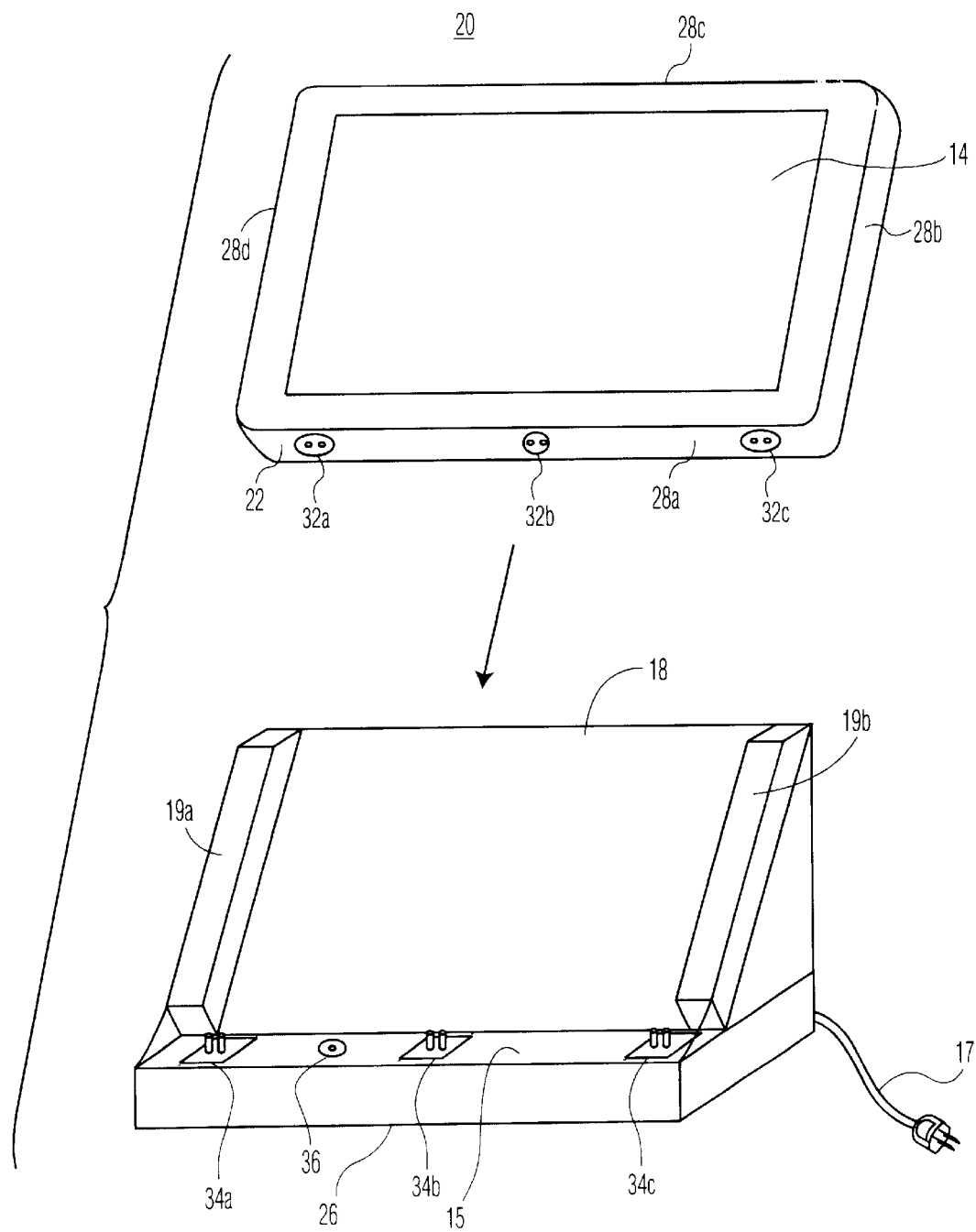
FIG. 2A shows a mobile display system according to a first embodiment of the invention.

FIG. 2A shows a mobile display system 20 according to a first embodiment of the invention. Display system 20 has the same basic configuration as that of system 10 in FIG. 1 and includes a mobile unit 22 and a base station 26. As shown in FIG. 2A, mobile unit 22 also includes electrical connectors 32a, 32b and 32c. Base station 26 also includes electrical connectors 34a, 34b and 34c and a detection mechanism, e.g., switch 36.

Figure 2B:
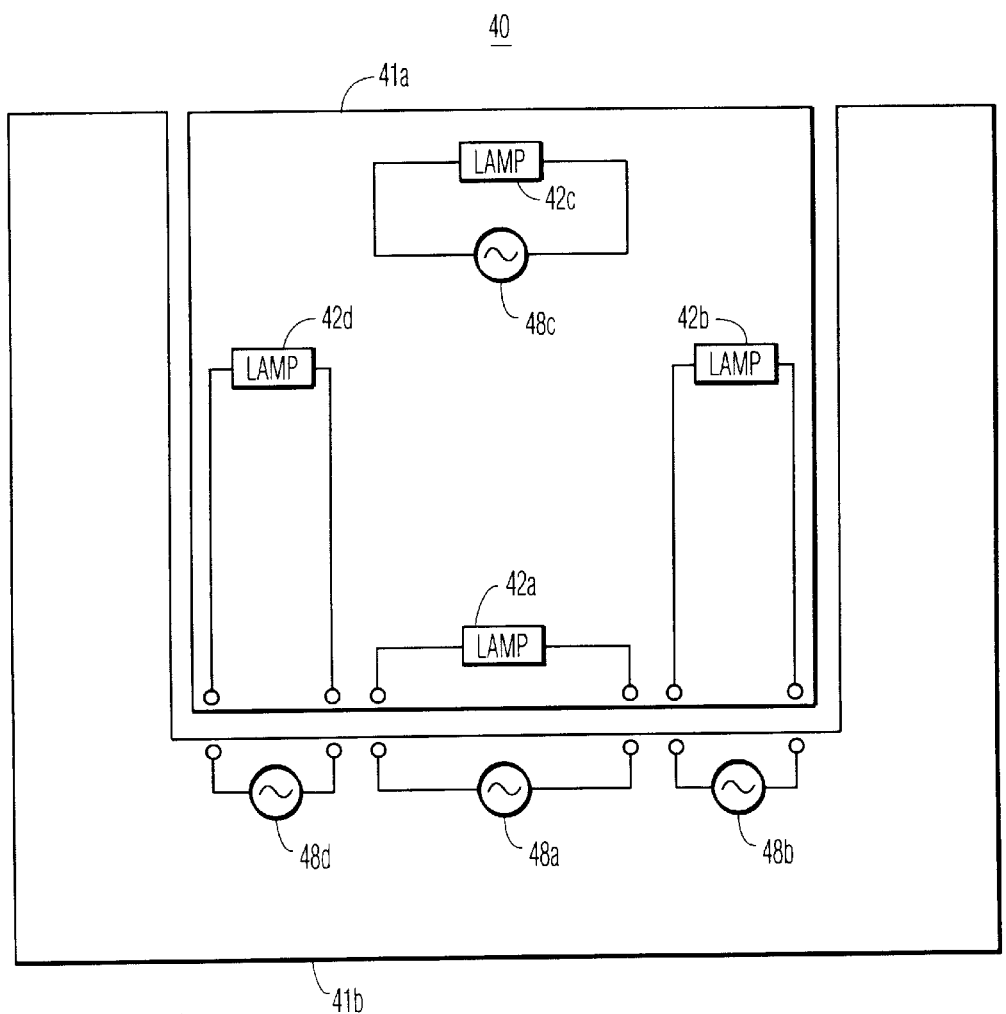
FIG. 2B shows a backlight system for the first embodiment of the invention.

FIG. 2B shows a backlight system 40 for the first embodiment of the invention. Backlight system 40 comprises a backlight circuit 41a in mobile unit 22 and a backlight circuit 41b in base station 26. As shown in FIG. 2B, backlight circuit 41a comprises a plurality of light sources, e.g., lamps 42a, 42b, 42c and 42d respectively located near edges of 28a, 28b, 28c and 28d of mobile unit 22. Although there are only four lamps illustrated, additional lamps may be used and placed along any of edges 28a, 28b and 28d. These lamps may be fluorescent lamps, LEDs or other types of light sources. Backlight circuit 41a also includes a built-in power supply 48c powered by a battery (not shown). Backlight circuit 41b includes a plurality of power supplies 48a, 48b, and 48d. In mobile mode, lamp 42c is used and powered by built-in power supply 48c. In docked mode, in addition to lamp 42c, lamps 42a, 42b and 42d are also used and powered by power supplies 48a, 48b and 48d, respectively, which are connected to an AC power outlet.

In backlight circuit 41b in base station 26, a plurality of backlight power supplies 48a, 48b and 48d are placed close to surface 15 (shown in FIG. 2A) for electrically connecting to connectors 32a, 32b and 32c on mobile unit 22, via connectors 34a, 34b and 34c respectively.

Once mobile unit 22 is attached to base station 26 in docked mode, connectors 32a and 32b are in contact with and connected to connectors 34a and 34b, respectively. In this mode, switch 36 is engaged, signaling base station 26 to power its internal power supplies 48a, 48b and 48d so as to power the lamps inside mobile unit 22, thereby increasing the light output at the viewable surface of display 14. In this embodiment, switch 36 is designed so that no high voltage from the internal power supplies of base station 26 is generated unless mobile unit 22 is fully attached to base station 26. This embodiment allows the use of a single power supply in the mobile unit, keeping weight and power consumption low, but allowing long battery life at the compromise of display surface light intensity.

Figure 3A:
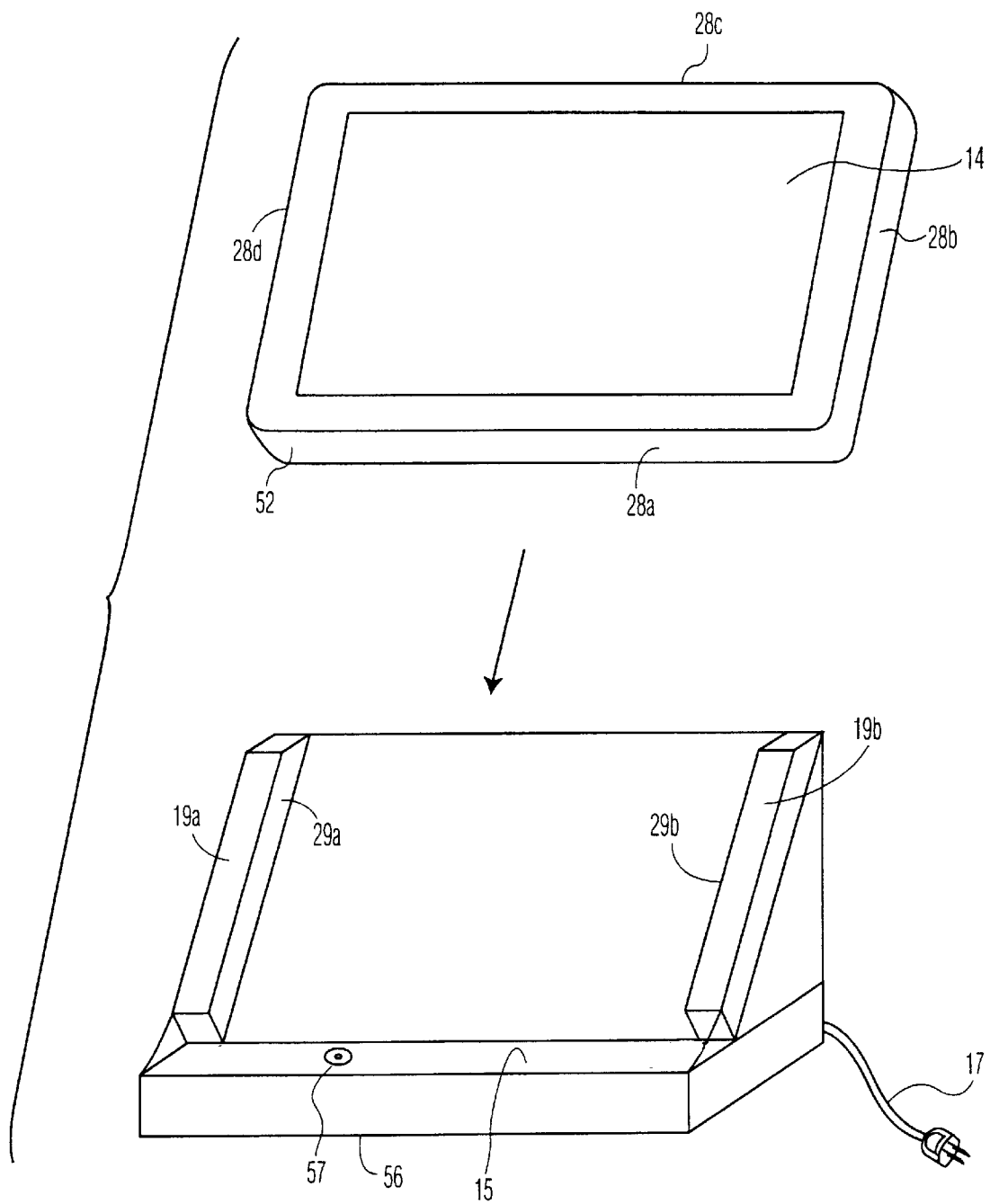
FIG. 3A shows a mobile display system according to a second embodiment of the invention.

FIG. 3A shows a mobile display system 50 according to a second embodiment of the invention. This embodiment again has the same basic configuration as that of system 10 in FIG. 1 and includes a mobile unit 52 and a base station 56. Base station 56 also includes a detection mechanism, e.g., switch 57.

Figure 3B:
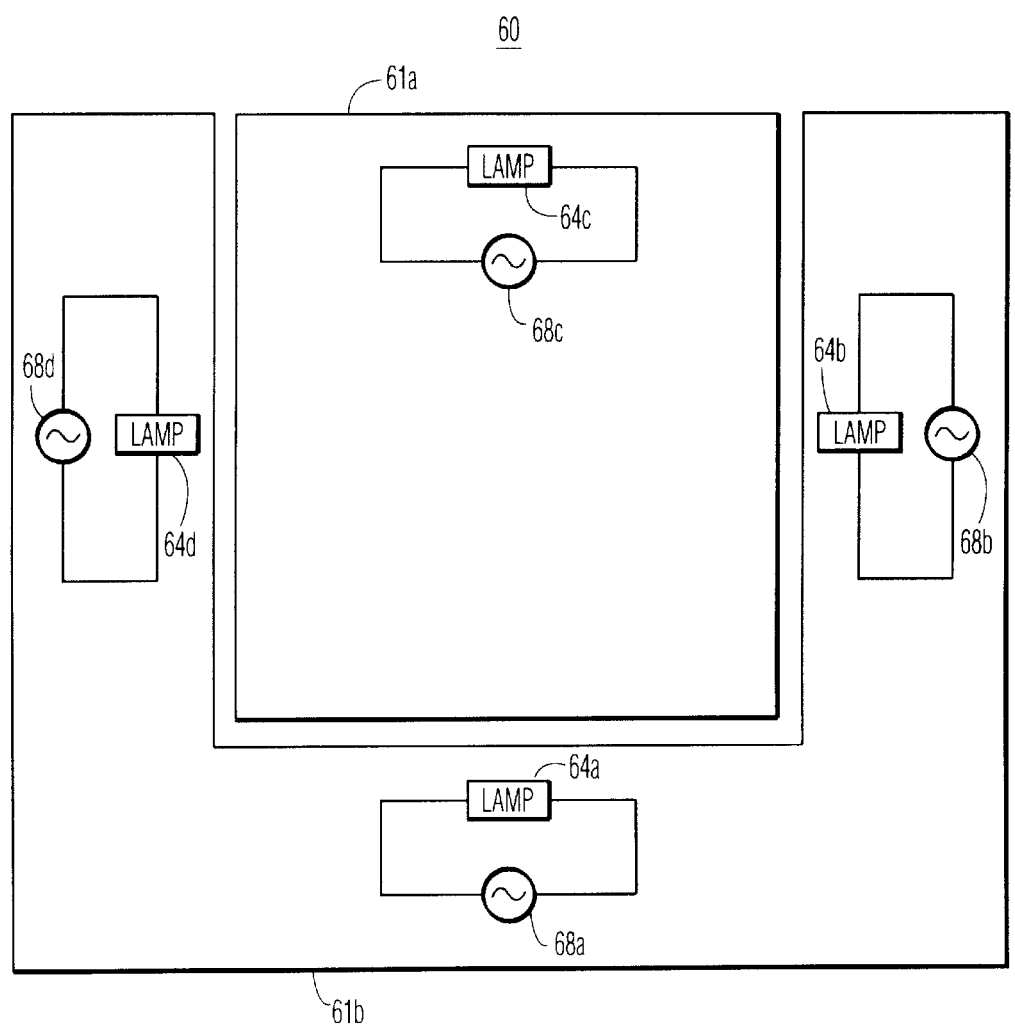
FIG. 3B shows a backlight system for the second embodiment of the invention.

FIG. 3B shows a backlight system 60 for the second embodiment of the invention. Backlight system 60 comprises a first backlight circuit 61a in mobile unit 52 and a second backlight circuit 61b in base station 56. Circuit 61a includes a single light Ail source, e.g., lamp 64c, located near edge 28c of mobile unit 52, and a single built-in power supply 68c powered by a battery (not shown). Circuit 61b includes a plurality of additional light sources, e.g., lamps 64a, 64b, and 64d, located close to surfaces 15, 29a and 29b, respectively and a plurality of additional power supplies 68a, 68b and 68d. In mobile mode, lamp 28c is used and powered by built-in power supply 68c. In docked mode, in addition to lamp 64c, lamps 64a, 64b and 64d are used and powered by power supplies 68a, 68b and 68d, respectively, which are connected to an AC power outlet. All of these lamps may be fluorescent lamps, LEDs or other types of light sources.

In this second embodiment, side surfaces 28a, 28b and 28d of mobile unit 52 may be constructed of, for instance, transparent or translucent material, capable of coupling light from outside of mobile unit 52 into the backlight structure of the unit. Alternatively, the complete encasing plastics of mobile unit 52 may be made of such transparent or translucent material. Surfaces 15, 29a and 29b of base station 56 may also be constructed of materials capable of coupling light from the lamps 64a, 64b, and 64d, out of base station 56, into mobile unit 52. When mobile unit 52 is attached to base station 56 in docked mode, switch 57 is activated and lamps in base station 56 are powered. This causes light to be optically coupled into mobile unit 52 through surface pairs 28a/15, 28b/29b, and 28d/29a, thereby increasing light output at the viewable surface of display 14.

This embodiment allows the use of a single power supply and a single light source in the mobile unit, keeping weight and power consumption low, but allowing long battery life at the compromise of display surface light intensity.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A backlight system for use with a mobile display system that includes a mobile unit capable of being powered by a battery and a base station capable of being powered by an external power source, the backlight system comprising:
   a first circuit in the mobile unit, the first circuit including a single light source disposed near a pre-selected edge of the mobile unit and a single power supply for powering the light source; and
   a second circuit in the base station, the second circuit including a plurality of light sources disposed near inner surfaces of the base station at least one power supply for powering the plurality of the light sources when the mobile unit is attached to the base station.

2. The system of claim 1, wherein the second circuit further comprises a plurality of power supplies for powering the plurality of light sources respectively when the mobile unit is attached to the base station.

3. A mobile display system comprising a mobile unit, the mobile unit including:
   a flat panel display having selected surfaces made in materials capable of coupling external light:
   a first backlight circuit for providing light to the display, the first backlight circuit including a single light source disposed near a pre-selected edge of the mobile unit and a single power supply for powering the light source; and
   a base station capable of being powered by an external power source, the base station including a second backlight circuit that comprises a plurality of light sources disposed near inner surfaces of the base station and at least one power supply for powering the plurality of light sources, the base station having selected surfaces made of materials capable of coupling light out of the plurality of light source and into the display when the mobile unit is attached to the base station.

4. The system of claim 3, wherein the base station further includes a detection mechanism for detecting whether the mobile unit is attached to the base station so as to allow light from the light sources in the base station to be coupled to the display.

5. The system of claim 4, wherein the second backlight circuit further comprises a plurality of power supplies for powering the plurality of light sources respectively when the mobile unit is attached to the base station.

6. A mobile displays system, comprising:

a mobile display unit and base station the mobile unit comprising a flat panel display having a surface capable of coupling external light, the mobile unit having a plurality of outer edge surfaces oriented perpendicular to a viewable display surface on the flat panel display; and wherein the base station adapted to receive the mobile unit, the base station has at least two inner edge surfaces that adjacently align with corresponding outer edge surfaces on the mobile unit at least one pair of aligned edge surfaces being made of selected materials enabling optical coupling between a light source included in a backlight circuit of the base station and a viewable surface of the flat panel display, thereby directing light into a side surface of the flat panel display, and increasing light output to the viewable display surface.

7. The system of claim 6, wherein the base station further includes a detection mechanism for detecting whether the mobile unit is attached to the base station so as to allow light from the light source in the base station to be coupled to the flat panel display.

8. The mobile display system of claim 6, wherein the mobile unit includes a backlight circuit for providing light to the display, the first backlight circuit including a single light source disposed near a pre-selected edge of the mobile unit and a single power supply for powering the light source.

9. The mobile display system of claim 8, wherein the base station's backlight circuit comprises a plurality of light sources disposed near edges of the base station and at least one power supply for powering the plurality of light sources.

10. The mobile display system of claim 6, wherein the mobile unit has a second pair of said aligned edge surfaces for optical coupling to the viewable area of the flat panel display.

11. A mobile display system, comprising a mobile unit having a flat panel display and a base station having a backlight circuit comprising at least one light source, the display having a viewable display area, the system including surface pairs constructed of materials for directing light from the backlight circuit into the flat panel display along a connecting of the pairs that directs light into a surface of the display other than into the plane of the viewable display area.

* * * * *